H. KLEE.
MANUFACTURE OF PLATES FROM FIBROUS SUBSTANCES, LIKE ASBESTOS, AND HYDRAULIC BINDING SUBSTANCES.
APPLICATION FILED SEPT. 14, 1906.
1,039,413. Patented Sept. 24, 1912.
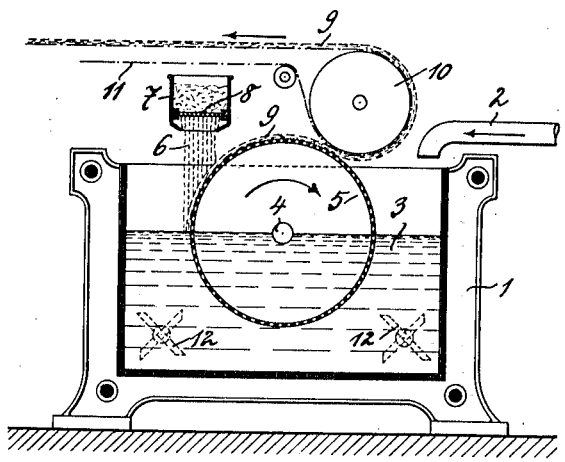
Witnesses:
Inventor:
Heinrich Klee,
By his Attorney,
F. H. Richards.

UNITED STATES PATENT OFFICE.

HEINRICH KLEE, OF KLAUSTHAL, GERMANY.

MANUFACTURE OF PLATES FROM FIBROUS SUBSTANCES, LIKE ASBESTOS, AND HYDRAULIC BINDING SUBSTANCES.

1,039,413.　　　　　Specification of Letters Patent.　　Patented Sept. 24, 1912.

Application filed September 14, 1906.　Serial No. 334,632.

*To all whom it may concern:*

Be it known that I, HEINRICH KLEE, manufacturer, a subject of the Empire of Germany, residing in Klausthal-of-the-Hartz, German Empire, have invented certain new and useful Improvements in the Manufacture of Plates from Fibrous Substances, Like Asbestos, and Hydraulic Binding Substances, of which the following is a specification.

The object of this invention is to provide an improved process for making plates composed of a fibrous material like asbestos mixed with a binding material such as cement, wherein the cement will be applied after the mixing of the fibers and previous to the pressing operation.

It is well known, in the manufacture of plates from fibrous substances, like asbestos, and hydraulic binding substances, for instance, cement, to carry out the manufacture with the help of a paper or cardboard machine in such manner that the fibrous substance is mixed with the binding substance in a rag engine or in some other stirring vat, and the mass is then brought on the perforated drum of the cardboard machine, in order to be converted into plates. According to another well known method, the manufacture of such plates is effected in such manner that the fibrous substance alone, prepared in a rag engine, is converted on the perforated cylinder or drum of a cardboard machine into a gauze, and is then removed from the perforated drum, placed on a conveyer felt band and there sprayed with cement, say in a dust chamber. The first process has the drawback that the cement has to be carried through the whole of the preparatory machines and that the manufacturing must be made in single charges, while the second process has the drawback that the asbestos and cement easily form merely superposed layers on the felt band.

The above drawbacks are obviated according to this invention by supplying to the fibrous substance the cement or other binding substance only after a previous treatment of the fibrous substance in a rag or like engine, the application of the cement or binding substance being effected before the application of the pressing or couching boards, for example, while the fibrous substance is still on the perforated drum or longitudinal sieve or band of the cardboard or like machine. The application of the cement therefore takes place while the material is still in the process of manufacture and before it is taken off from the sieve or band. As the fibrous material is then still in a loose open state, the binding substance in the form of powder in a dry or moistened state will be absorbed in such manner that no formation of layers will take place, but on the contrary a thorough mixing of the binding substance with the fibrous material is attained.

The accompanying drawing illustrates diagrammatically a machine by which the process may be carried out.

The vat 1 receives the fiber through a pipe 2, and is suitably mixed therein with water by blades 12. The sieve member is shown in the form of a perforated cylinder 5 on shaft 4, and takes up the fiber in the form of a layer 9 from which it passes to the pressing roll 10 that is provided with the usual flat band 11. The hydraulic cement preferably in the form of powder either dry or moist is placed in a vessel 7 having a perforated bottom 8, from which the cement will fall onto the web 9 immediately after being taken up from the vat and before it is subjected to the pressing operation on the roll 10. In this condition the web is still moist from the vat to readily mix with the cement, and which latter is pressed or worked into the web by the pressing roll 10. It will be observed that the vessel 7 containing the hydraulic cement is so located that the cement instead of all falling on the drum 5 will part fall on the surface of the asbestos mixture 3 in the vat that is immediately taken up by the drum to form the layer 9.

Having now particularly described and ascertained the nature of my said invention and in what manner the same is to be performed, I declare that what I claim is—

1. The process of manufacturing plates from fibrous material and hydraulic binding material consisting in, first mixing the fibrous material with water, thereupon forming the mixture into an open, loose web, thereupon, and before any pressing or rolling of said web whatever, applying the hydraulic binding material thereto, and thereupon, subjecting the same to such couching and pressing operation as are necessary for the formation of the finished plates.

2. The process of manufacturing plates from fibrous materials and hydraulic binding material consisting in first mixing the fibrous material with water and thereupon forming the mixture into an open loose web and at the same time applying hydraulic binding material to the surface of the web previous to any rolling or pressing of the web and thereupon subjecting the web to the final pressing operation to form the finished plates.

In witness whereof I have hereunto signed my name this 29th day of August 1906 in the presence of two subscribing witnesses.

HEINRICH KLEE.

Witnesses:
WOLDEMAR HAUPT,
HENRY HASPER.